United States Patent [19]

Karasawa

[11] Patent Number: 5,241,445
[45] Date of Patent: Aug. 31, 1993

[54] ELECTRONIC PART HAVING SAFEGUARD FUNCTION
[75] Inventor: Atsushi Karasawa, Neyagawa, Japan
[73] Assignee: Matsushita Electric Industrial Co., Ltd., Osaka, Japan
[21] Appl. No.: 623,432
[22] PCT Filed: Apr. 23, 1990
[86] PCT No.: PCT/JP90/00524
   § 371 Date: Dec. 19, 1990
   § 102(e) Date: Dec. 19, 1990
[87] PCT Pub. No.: WO90/13165
   PCT Pub. Date: Nov. 1, 1990
[30] Foreign Application Priority Data
   Apr. 24, 1989 [JP]  Japan .................. 1-103868
[51] Int. Cl.$^5$ ............................. H01H 85/44
[52] U.S. Cl. .................... 361/104; 337/186; 337/252; 337/278; 337/279
[58] Field of Search ............... 361/104; 337/279, 186, 337/252, 278

[56] References Cited
U.S. PATENT DOCUMENTS
3,896,343  7/1975  Baker et al. .................. 361/120
3,913,500 10/1975  Manker et al. ............... 337/279
4,451,814  5/1984  Barry et al. .................. 337/407

FOREIGN PATENT DOCUMENTS
3643622  6/1988  Fed. Rep. of Germany .
50-2346  1/1975  Japan .
58-82433  5/1983  Japan .
62-39569  3/1987  Japan .
63-18925  1/1988  Japan .

Primary Examiner—Todd E. DeBoer
Attorney, Agent, or Firm—Stevens, Davis, Miller & Mosher

[57] ABSTRACT

Disclosed is an electronic part having a safeguard function for protecting the associated electronic equipment against abnormally high voltages such as lightning surge voltage. It is equipped with an element which cuts off any continuous excess current so as to prevent the surge absorbing element and the protected circuit from being spontaneously ignited. This electronic part having a safeguard function comprises: a surge absorbing element (1); a low-melting-point metal element (23) which is electrically connected in series with said surge absorbing element (1) and which is held in contact with said surge absorbing element (1) in such a manner as to allow a satisfactory heat conduction therebetween; and a thermocontractive insulating tube (25) which covers over the periphery of said surge absorbing element (1) and the periphery of said low-melting-point metal element (23).

6 Claims, 19 Drawing Sheets

ELECTRONIC PART HAVING SAFEGUARD FUNCTION

TECHNICAL FIELD

This invention relates to an electronic part having a safeguard function which is equipped with an element that cuts off any excess current in an abnormal condition.

BACKGROUND ART

Nowadays, the number of functions with which an electronic part is endowed has been increasing. As a result, more and more electronic parts using semiconductor devices are being adopted for use in household electric equipment, information equipment, communication equipment, industrial equipment, etc. The semiconductor devices which are used in such electronic parts are extremely sensitive to an abnormal voltage such as static electricity or a lightning surge voltage. Accordingly, it is not unusual to cause a malfunction of the associated electronic apparatus or the destruction thereof. Thus, it is very important to overcome the problem of surge voltages in these semiconductor devices so that the associated electronic apparatus may have a higher degree of reliability.

To cope with this problem, a surge absorber has conventionally been used. Such a surge absorber, however, is short-circuited when it malfunctions as a result of deterioration, etc., so that there is the danger of its being overheated and ignited. To avoid such an accident, a number of measures have been proposed.

FIGS. 36 and 37 show the construction of a conventional surge absorber. The surge absorber shown includes a surge absorbing element 1, and electrodes 2a and 2b provided on both sides thereof. The surge absorber also includes elastic leads 3 and 4, which are connected to the electrode 2a by means of low-melting-point solders 5, and a lead 6, which is connected to the electrode 2b by means of a high-melting-point solder (not shown). The leads 3, 6 and 4 are connected, respectively, to the connection terminals 8, 9 and 10 on a supporting member 7.

The operation of this surge absorber, constructed as described above, will now be described. FIG. 37 shows the way in which this surge absorber is used. The connection terminals 8 and 9 are connected to a power source 11, and the connection terminals 9 and 10 are connected to a circuit 12 which is to be protected. Normally, the section between the connection terminals 8 and 10 is short-circuited, and the section between the connection terminals 8 and 9 has such a high resistance that they are isolated from each other. When a surge voltage is generated in the power line, the resistance of the surge absorbing element 1 is lowered, and the section between the connecting terminals 8 and 9 becomes nearly short-circuited, with the result that the surge current does not flow through the circuit 12 to be protected. Instead, the surge current flows between the connecting terminals 8 and 9, thus allowing the surge to be absorbed. When, in this circuit, a continuous excess voltage is applied to the power line, a continuous excess current flows to the surge absorbing element 1. As a result, the surge absorbing element 1 is heated and fuses the low-melting-point solder 5, so that the elastic leads 3 and 4 are separated from the electrode 2a, as indicated by the arrow in FIG. 38. Accordingly, the surge absorbing element 1 and the circuit 12 to be protected are isolated from the power source 11. Thus, this surge absorber acts as an electronic part having a safeguard function.

The problem with this conventional construction is that, when a continuous excess current flows through the surge absorbing element 1 and causes the low-melting-point solders to melt so as to separate the leads 3 and 4 from the electrode 2a, which have been connected to the latter, an arc discharge due to the high voltage may occur between the electrode 2a and the leads 3 and 4 which have been separated therefrom. Thus, the surge absorbing element 1 cannot be perfectly isolated from the excess current, which means that there is still the danger of the surge absorbing element 1 being ignited.

DISCLOSURE OF THE INVENTION

It is accordingly an object of this invention to eliminate the problem that an accident such as ignition may occur to an electronic part when a continuous excess current is allowed to flow into it.

In order to achieve this object, this invention provides an electronic part having a safeguard function, comprising: an electronic part; a low-melting-point metal element which is electrically connected in series with this electronic part and which is held in contact with this electronic part in such a manner as to allow a satisfactory heat conduction therebetween; and a thermocontractive insulating tube covering over the periphery of the electronic part and as well that of the low-melting-point metal element.

When, in this construction, a continuous excess voltage is applied to the electronic part having a safeguard function according to this invention and a continuous excess current flows into this electronic part to cause it to be abnormally heated, the low-melting-point metal element is fused by this heat, and then the thermocontractive insulating tube contracts. The contraction of this thermocontractive insulating tube causes the low-melting-point metal element to be cut. In other words, the thermocontractive insulating tube, which acts as an insulator, is allowed to break into the low-melting-point metal element, which has been fused. Therefore, the excess current is totally prevented from flowing into the electronic part, and, thanks to the presence of the thermocontractive insulating tube, an arc discharge can be avoided. In this way, this electronic part and the associated circuit to be protected (shown at 12 in FIG. 37.; can be prevented from being ignited.

BEST MODE FOR CARRYING OUT THE INVENTION

Figure 1:
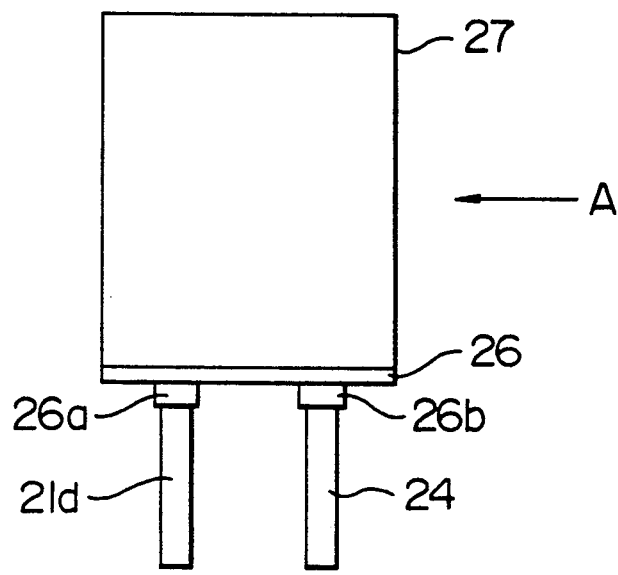
FIG. 1 is a front view of an electronic part having a safeguard function in accordance with a first embodiment of this invention.
Figure 2:
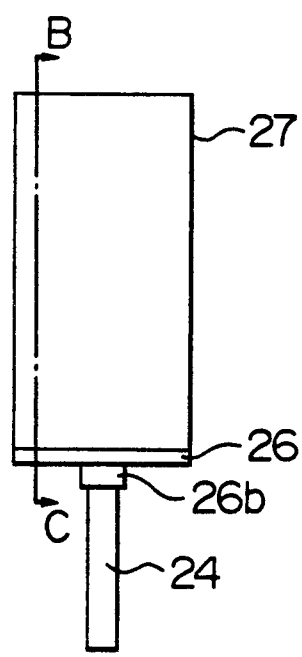
FIG. 2 is a side view of the same.
Figure 3:
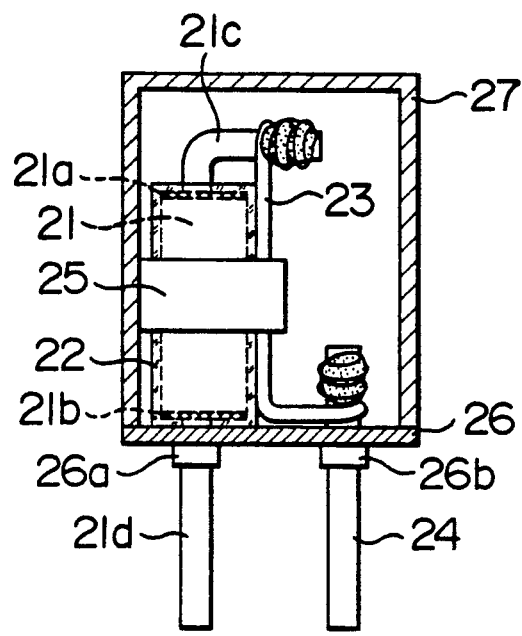
FIG. 3 is a sectional view of the same.

FIG. 1 is a front view of a surge absorber having a safeguard function which constitutes a first embodiment of an electronic part having a safeguard function of this invention. FIG. 2 is a side view taken in the direction of the arrow A of FIG. 1, and FIG. 3 is a sectional view taken along the line B-C of FIG. 2. In FIGS. 1, 2 and 3, the reference numeral 21 indicates a surge absorbing element of the type which is disclosed, for example, in U.S. Pat. No. 3663458 and No. 4045374. This surge absorbing element includes a cylindrical base body, whose flat end sections are equipped with electrodes 21a and 21b, respectively, which are formed through the baking of silver paste, etc. Metal connecting leads 21c and 21d, which are made of a good conductor of electricity such as copper or brass, are connected to these electrodes 21a and 21b, respectively, by means of a high-melting-point solder (not shown) or the like. The reference numeral 22 indicates an insulator, which is made of an inorganic non-metal material such as glass and which partly or entirely covers over the surface of the surge absorbing element 21. The reference numeral 23 indicates a low-melting-point metal element such as a solder wire of a tin/lead eutectic alloy. One end of this low-melting-point metal element 23 is connected to the connecting lead 21c and the other end thereof is connected to a connecting lead 24, which are made of a good conductor of electricity such as copper or brass, both connections being effected by soldering or the like in which a laser, etc. is used. The reference numeral 25 indicates a thermocontractive insulating tube which is made, for example, of silicon, which excels in heat resistance, flame resistance, and arc resistance, and which is adapted to contract, when heated, to a diameter smaller than that of the surge absorbing element 21. This thermocontractive insulating tube 25 covers over the periphery of the surge absorbing element 21 and as well that of the low-melting-point metal element 23 in such a manner that the insulator 22, with which the surface of the surge absorbing element 21 is coated, is in close contact with the surface of the low-melting-point metal element 23, holding them firmly together. The reference numeral 26 indicates an insulating-resin fixing section, which is made, for example, of polyphenylene sulfide so as to excel in heat resistance, flame resistance, and arc resistance, and which is attached to the connecting leads 21d and 24 by insert-forming or the like so as to be in close contact with these leads. The parts indicated by the reference numeral 26a and 26b belong to this insulating-resin fixing section 26. These parts partly cover over the connecting leads 21d and 24, thereby securely keeping the creeping distance between these connecting leads. The reference numeral 27 indicates an insulating-resin enclosing section, which is made, for example, of polyphenylene sulfide and which excels in heat resistance, flame resistance, and arc resistance. This insulating-resin enclosing section 27 is closely attached to the insulating-resin fixing section 26 by ultrasonic welding or the like so as to prevent the low-melting-point metal element 23 from being scattered when it is fused and to provide moisture proofness.

Figure 4:
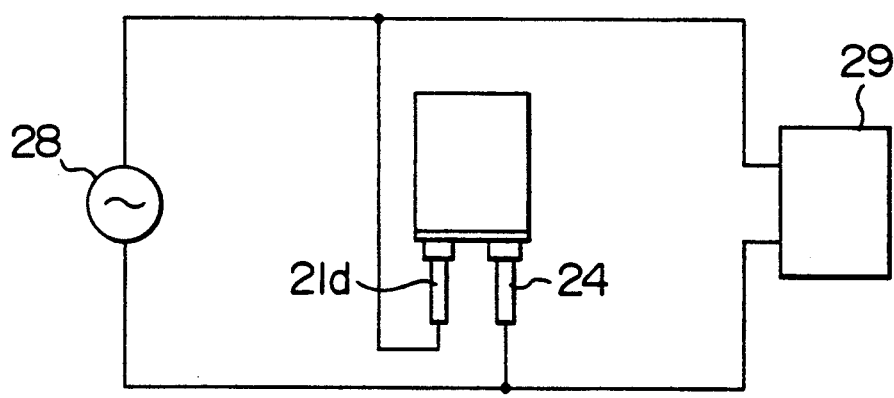
FIG. 4 is a circuit diagram showing an example of the way the electronic part of this embodiment is used.

The operation of this surge absorber with a safeguard function, constructed as described above, will now be described. In the example shown in FIG. 4, this surge absorber having a safeguard function is applied to a communication line (such as a telephone line). The reference numeral 28 indicates a signal source, which is connected to the connecting leads 21d and 24 of this surge absorber with a safeguard function, and the reference numeral 29 indicates a protected circuit, which is connected to the connecting leads 21d and 24. Since the operation starting voltage (the varistor voltage) of the surge absorbing element 21 is set higher than the peak value of the signal source 28 (the sum of the circuit voltage and the peak value of the lingering signal), the section between the connecting leads 21d and 24 exhibits a high resistance, so that the circuit is nearly open. If, in this communication line, a surge voltage is generated, the resistance of the surge absorbing element 21 is lowered, and the section between the connecting leads 21d and 24 is nearly short-circuited, so that the surge current does not flow through the protected circuit 29 but through the section between the connecting leads 21d and 24, thus absorbing the surge.

A communication line like this, however, is in many cases in close proximity to a power cable. If a continuous excess voltage (which is higher than the operation starting voltage of the surge absorbing element 21) is generated when this power cable interferes therewith is applied to this communication line, a continuous excess current flows through the surge absorbing element 21. If the value of this continuous excess current is higher than the maximum non-fusing current, value for the low-melting-point metal element 23 (the value is determined by the material and the diameter of this metal element), the low-melting-point metal element 23 is fused because of spontaneous exothermic effect due to the Joule effect. If the value of this continuous excess current is lower than the maximum non-fusing current value mentioned above, the surge absorbing element 21 is gradually heated, and this heat is transmitted through the insulator 22, which is made of a material with good heat conductivity, to the low-melting-point metal element 23, thereby fusing this metal element. In either case, the thermocontractive insulating tube 25 contracts in the radial direction simultaneously with the fusing of the low-melting-point metal element 23, and the low-melting-point metal element 23, which has been fused, is forced outwards because of the radial contraction of the thermo-contractive insulating tube 25, with the result that the low-melting-point metal element 23 is divided into two parts which are separated clearly from each other with the thermocontractive insulating tube 25 therebetween. In other words, when the low-melting-point metal element 23 has been fused, the excess current which has been flowing through the surge absorbing element 21 is totally cut off by the presence of the thermocontractive insulating tube 25, which acts as an insulator, without causing any arc discharge after the separation of the low-melting-point metal element 23. Accordingly, the heating of the surge absorbing element 21 is stopped, thus preventing it from being ignited.

Table 1 shows the results of an experiment in which excess voltages of various levels were applied to a surge absorber in accordance with this embodiment. In this experiment, a varistor whose operation starting voltage (varistor voltage) is 360 volts (I = 1 mA) was used as the surge absorbing element 21, and a solder line whose melting point is 183° C. and whose diameter is 0.3 mm was used as the low-melting-point metal element 23.

TABLE 1

| Applied voltage | Short-circuiting current | Result |
|---|---|---|
| AC 600 Vrms | 40 A | Circuit opened after 0.030 to 0.074 sec. No ignition |
| | 7 A | Circuit opened after 0.54 to 0.85 sec. No ignition |
| | 2.2 A | Circuit opened after 1.26 to 2.52 sec. No ignition |
| | 1.0 A | Circuit opened after 2.72 to 4.40 sec. No ignition |
| | 0.5 A | Circuit opened after 4.64 to 6.54 sec. No ignition |
| | 0.25 A | Circuit opened after 8.08 to 14.8 sec. No ignition |

Thus, the surge absorber with a safeguard function of this embodiment is effective in preventing connecting lead 21c, and the other end of this metal element is connected to the connecting lead 24, both connections being effected by soldering or the like in which a laser beam, etc. is used. The reference numeral 25 indicates a thermocontractive insulating tube, which is adapted to contract, when heated, to a diameter smaller than that of the surge absorbing element 21, and which covers over the periphery of the surge absorbing element 21 and that of the low-melting-point metal element 23 in such a manner that the surface of the insulator 22, which cover over the surface of the surge absorbing element 21, is in close contact with the low-melting-point metal element 23. The reference numeral 30 indicates an insulating-resin fixing section, which is made, for example, of polyphenylene sulfide, so as to excel in heat resistance, flame resistance, and arc resistance, and which is attached to the connecting leads 21c, 21d and 24 by insert-forming or the like so as to be in close contact with these leads. The portions indicated by the reference numerals 30a, 30b and 30c constitute a part of this insulating-resin fixing section 30. These portions partly cover the connecting leads 21c, 21d and 24, thereby securely keeping the creeping distance between these connecting leads constant. The reference numeral 31 indicates an insulating-resin enclosing section, which is made, for example, of polyphenylene sulfide and which excels in heat resistance, flame resistance, and arc resistance. its surge absorbing element 21 from being ignited by a continuous excess current.

Figure 5:
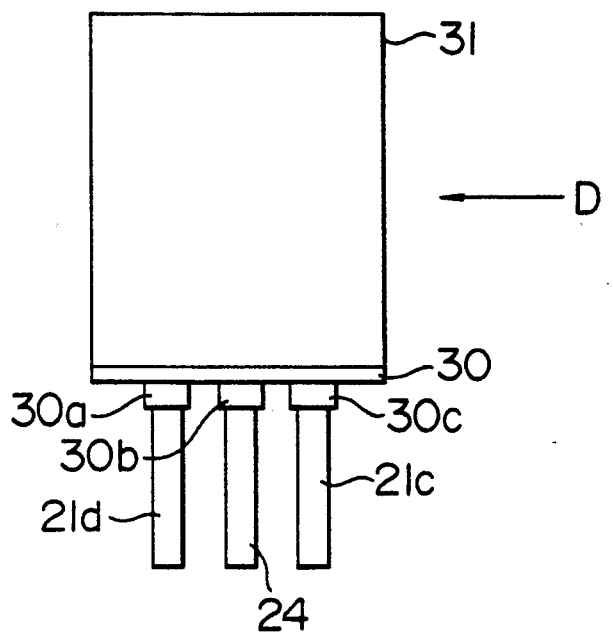
FIG. 5 is a front view showing a second embodiment of this invention.
Figure 6:
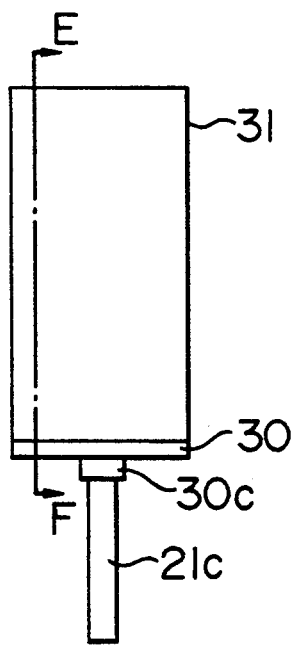
FIG. 6 is a side view of the same.
Figure 7:
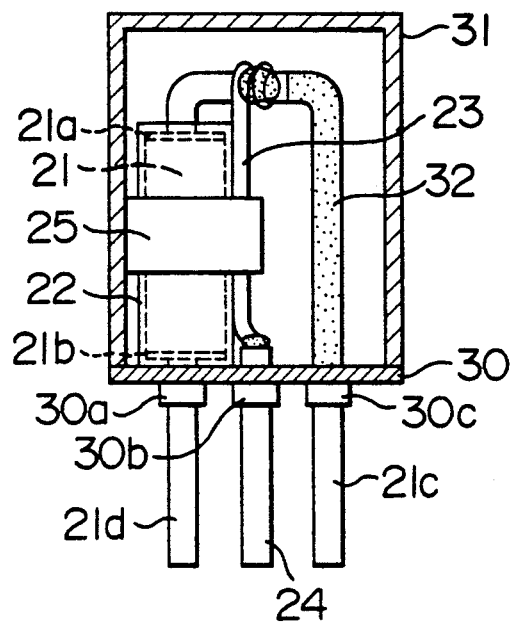
FIG. 7 is a sectional view of the same.

Next, a second embodiment of this invention will be described with reference to FIGS. 5, 6 and 7. FIG. 5 is a front view of a surge absorber with a safeguard function in accordance with the second embodiment, FIG. 6 is a side view taken in the direction indicated by the arrow D in FIG. 5, and FIG. 7 is a sectional view taken along the line E-F in FIG. 6. This embodiment is different from the first one in that an additional connecting lead extends from the connection point between the surge absorbing element 21 and the low-melting-point metal element 23, thus forming a three-lead-terminal structure. Referring to FIG. 7, the reference numeral 21 indicates a surge absorbing element, which consists, for example, of a varistor, and which is equipped with electrodes 21a and 21b, which are formed on the flat end surfaces of the cylindrical body. Connecting leads 21c and 21d are connected to these electrodes 21a and 21b, respectively. The reference numeral 22 indicates an insulator, which is made, for example, of an inorganic non-metal material such as glass and which partly or entirely cover over the surface of the surge absorbing element 21. The reference numeral 23 indicates a low-melting-point metal element, which consists, for example, of a solder line of a tin/lead eutectic alloy. One end of this low-melting-point metal element 23 is connected to the This insulating-resin enclosing section 31 is closely attached to the insulating- resin fixing section 30 by ultrasonic welding or the like so as to prevent the low-melting-point metal element 23 from being scattered when it is fused and to provide moisture proofness. The reference numeral 32 indicates an insulating coating material, which cover over that portion of the connecting lead 21c which is surrounded by the insulating-resin fixing section 30 and the insulating-resin enclosing section 31, except for that portion thereof which is connected to the low-melting-point metal element 23.

Figure 8:
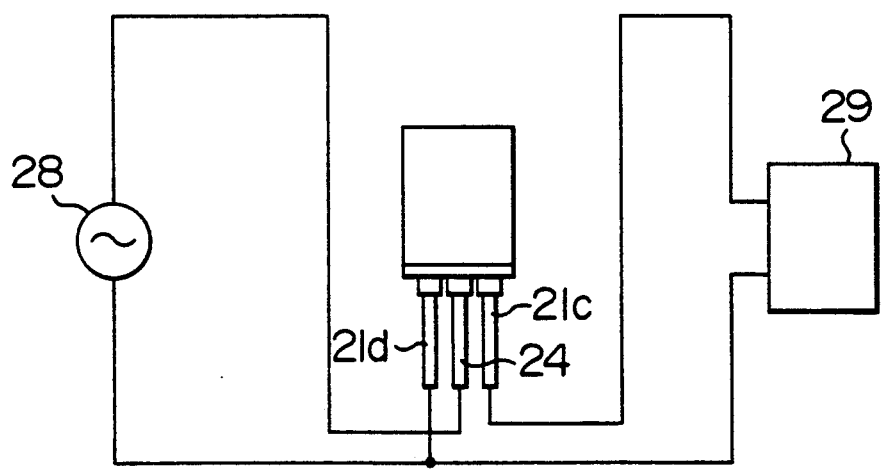
FIG. 8 is a circuit diagram showing an example of the way the electronic part of this embodiment is used.
Figure 9:
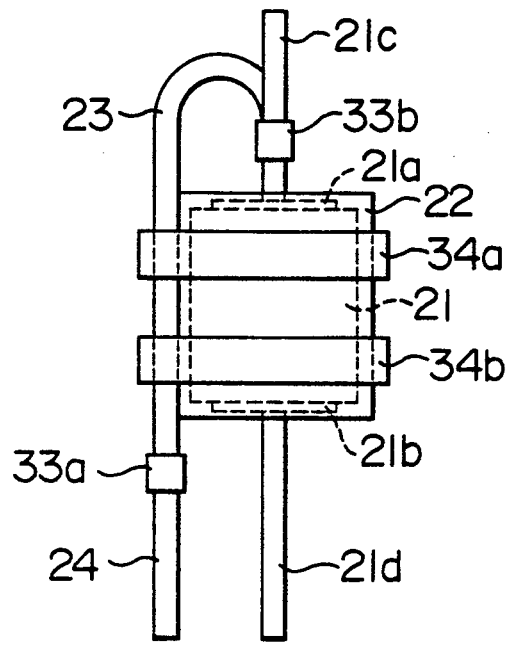
FIG. 9 is a front view showing the essential parts of a third embodiment of this invention.

The operation of this surge absorber with a safeguard function, constructed as described above, will now be described. In the example shown in FIG. 8, this surge absorber having a safeguard function is applied to a communication line (such as a telephone line). The reference numeral 28 indicates a signal source, which is connected to the connecting leads 21d and 24 of this surge absorber with a safeguard function, and the reference numeral 29 indicates a protected circuit, which is connected to the connecting leads 21c and 21d. Since the operation starting voltage (the varistor voltage) of the surface absorbing element 21 is normally set higher than the peak value of the signal source 28 (the sum of the circuit voltage and the peak value of the lingering signal), the section between the connecting lead 21d and the connecting lead 24 or the connecting lead 21c exhibits high resistance, so that the circuit is nearly open. Accordingly, the operation of this embodiment is similar to that of the first embodiment. Thus, if, in this communication line, a continuous excess voltage (which is higher than the operation starting voltage of the surge absorbing element) due to interference with a power cable is applied to this communication line, the low-melting-point metal element 23 will be fused, as in the first embodiment, and the section between the connecting leads 21c and 24 and the section between the connecting leads 21d and 24 will become open, so that not only the surge absorbing element 21 but also the protected circuit can be prevented from being spontaneously ignited Next, a third embodiment of this invention will be described with reference to FIG. 9, which shows the construction of a surge absorber with a safeguard function in accordance with the third embodiment of this invention. This embodiment is different from the first and the second embodiments in that two separate thermocontractive insulating tubes 34a and 34b are arranged with a predetermined space therebetween. The reference numeral 21 indicates a surge absorbing element, which consists, for example, of a varistor, and which is equipped with electrodes 21a and 21b, which are formed on the flat end surfaces of the cylindrical body thereof. Connecting leads 21c and 21d are connected to these electrodes 21a and 21b, respectively. The reference numeral 22 indicates an insulator, which is made, for example, of an inorganic non-metal material such as glass and which partly or entirely covers over the surface of the surge absorbing element 21. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 21c by, for example, a caulking member 33b. The reference numerals 34a and 34b indicate thermocontractive insulating tubes, which are adapted to contract, when heated, to such an extent that their diameter become smaller than that of the surge absorbing element 21. These thermocontractive insulating tubes, which are arranged with a predetermined space therebetween, cover over the surge absorbing element 21 and the low-melting-point metal element 23 in such a manner that the surface of the insulator 22, which covers over the surface of the surge absorbing element 21, is held in close contact with the low-melting-point metal element 23. Further, as in the first and the second embodiments, the components of this embodiment are in many cases enclosed by an insulating resin or the like except for the tip portions of the connecting leads 21c, 21d and 24 so as to prevent the low-melting-point metal element 23 from being scattered when it is fused and to provide moisture proofness. Such an enclosing structure, however, is not shown in FIG. 9. The operation of this surge absorber, constructed as described above, is similar to that of the first and the second embodiments. Since, however, the two thermocontractive insulating tubes 34a and 34b are arranged with a predetermined space therebetween, the low-melting-point metal element 23 is cut at two positions when fused, which means the length of the insulating section is larger than in the first and the second embodiments, thus making it possible to cut off a continuous excess current more reliably. In addition, the dispersion in the length of the time by which the fusion takes place can be made smaller.

Figure 10:
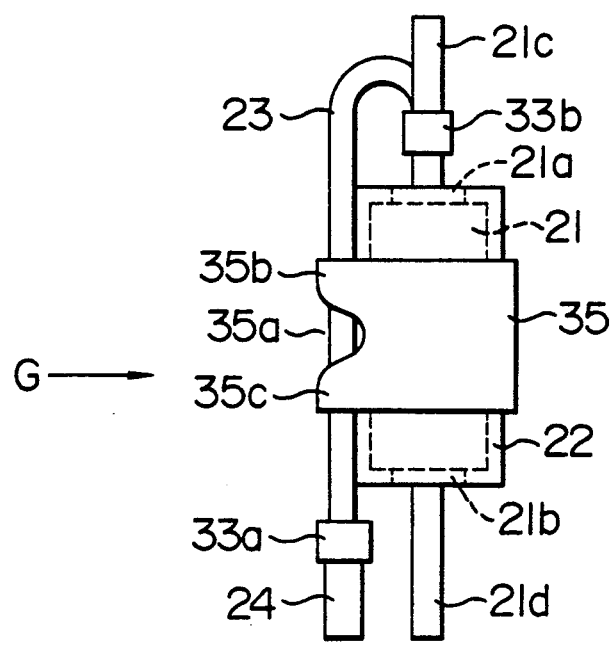
FIG. 10 is a front view showing the essential parts of a fourth embodiment of this invention.
Figure 11:
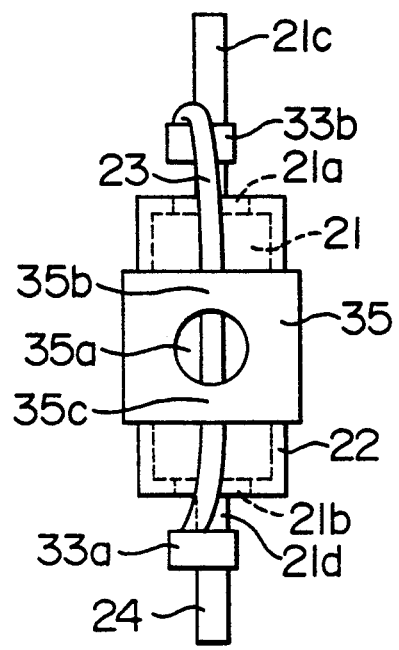
FIG. 11 is a side view of the same.

A fourth embodiment of this invention will now be described with reference to FIGS. 10 and 11. FIG. 10 is a front view of a surge absorber with a safe guard function in accordance with the fourth embodiment of this invention, and FIG. 11 is a side view of the same taken in the direction indicated by the arrow G of FIG. 10. This embodiment is different from the first, the second and the third embodiments in that it employs a thermocontractive insulating tube 35 which has an opening 35a in its peripheral wall. Referring to Figs. 10 and 11, the reference numeral 21 indicates a surge absorbing element, which consists, for example, of a varistor, and which is equipped with electrodes 21a and 21b, which are formed on the flat end surfaces of the cylindrical body thereof. Connecting leads 21c and 21d are connected to these electrodes 21a and 21b, respectively. The reference numeral 22 indicates an insulator, which is made, for example, of an inorganic non-metal material such as glass and which partly or entirely covers over the surface of the surge absorbing element 21. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 21c by, for example, a caulking member 33b. The reference numeral 35 indicates a thermocontractive insulating tube, which is adapted to contract, when heated, to such a degree that its diameter becomes smaller than that of the surge absorbing element 21. This thermocontractive insulating tube has an opening 35a in that section of its peripheral surface which corresponds to the position of the low-melting-point metal element 23, so that when it covers over the periphery of the surge absorbing element 21 and that of the low-melting-point metal element 23 in such a manner that the surface of the insulator 22, which covers the surface of the surge absorbing element 21, is in close contact with the low-melting-point metal element 23, two tube portions 35b and 35c of the thermocontractive insulating tube 35, which result from the presence of the opening 35a, are in contact with the low-melting-point metal element 23. Further, as in the first and the second embodiments, the components of this embodiment are in many cases enclosed by an insulating resin or the like except for the tip portions of the connecting leads 21c, 21d and 24 so as to prevent the low-melting-point metal element 23 from being scattered when it is fused and to provide moisture proofness. Such an enclosing structure, however, is not shown in FIGS. 10 and 11. The operation of this surge absorber, constructed as described above, is similar to that of the first, the second and the third embodiments. Since, however, the two tube portions 35b and 35c of the thermocontractive insulating tube 35 are in contact with the low-melting-point metal element 23, the low-melting-point metal element 23 is cut at two positions when fused, which means that the length of the insulating section is larger than in the first and the second embodiments, thus making it possible to cut off a continuous excess current more reliably. In addition, the dispersion in the length of the time by which the fusion takes place can be made smaller. These advantages can also be provided by the third embodiment. In the third embodiment, however, the process steps of arranging the two thermocontractive insulating tubes 34a and 34b with a predetermined space therebetween is rather difficult to perform, whereas, in this embodiment, the predetermined space is fixed because of the opening 35a, which leads to an improvement in the working efficiency, reduction in the cost, etc.

Figure 12:
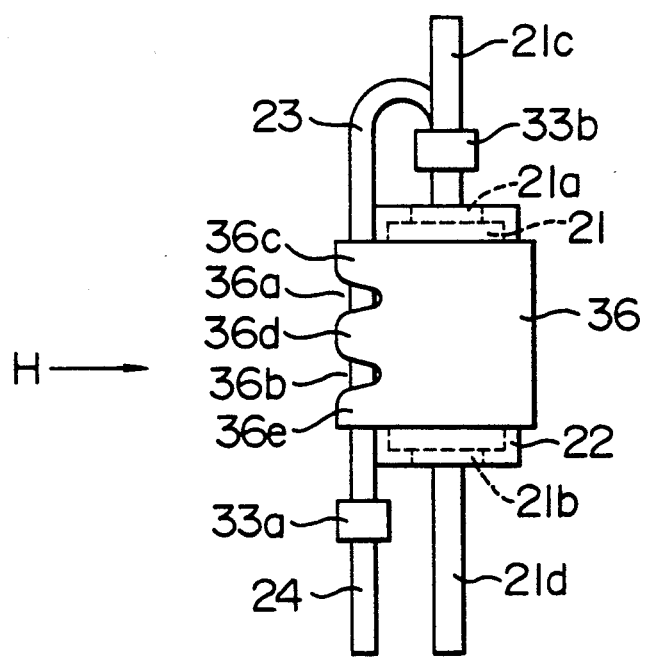
FIG. 12 is a front view showing the essential parts of a fifth embodiment of this invention.
Figure 13:
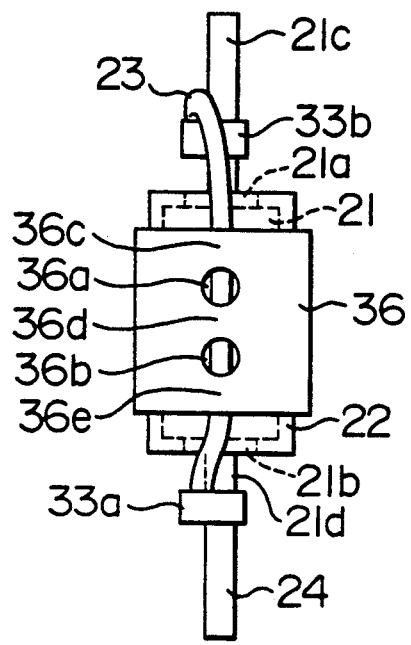
FIG. 13 is a side view of the same.

Next, a fifth embodiment of this invention will be described with reference to FIGS. 12 and 13. FIG. 12 is a front view of a surge absorber with a safe guard function in accordance with the fifth embodiment of this invention, and FIG. 13 is a side view of the same taken in the direction of the arrow H of FIG. 12. This embodiment is different from the fourth embodiment in that it employs a thermocontractive insulating tube 36 which has two openings 36a and 36b. In FIGS. 12 and 13, the reference numeral 21 indicates a surge absorbing element, which consists, for example, of a varistor, and which is equipped with electrodes 21a and 21b, which are formed on the flat end surfaces of the cylindrical body thereof. Connecting leads 21c and 21d are connected to these electrodes 21a and 21b, respectively. The reference numeral 22 indicates an insulator, which is made, for example, of an inorganic non-metal material such as glass and which partly or entirely covers over the surface of the surge absorbing element 21. The reference numeral 23 indicates a low-melting-point metal element, which consists, for example, of a solder line of a tin/lead eutectic alloy. One end of this low-melting-point metal element 23 is connected to the 33a, and the other end of this metal element is connected to the connecting lead 21c by, for example, a caulking member 33b. The reference numeral 36 indicates a thermocontractive insulating tube, which is adapted to contract, when heated, to such a degree that its diameter becomes smaller than that of the surge absorbing element 21. This thermocontractive insulating tube has two openings 36a and 36b in its peripheral surface, so that when it covers over the surface of the insulator 22, which covers over the surge absorbing element 21, and the periphery of the low-melting-point metal element 23, three tube portions 36c, 36d and 36e of the thermocontractive insulating tube 36, which result from the presence of the two opening 36a and 36b, are in contact with the low-melting-point metal element 23. Further, as in the first and second embodiments, the components of this embodiment are in many cases enclosed by an insulating resin or the like except for the tip portions of the connecting leads 21c, 21d and 24 so as to prevent the low-melting-point metal element 23 from being scattered when it is fused and to provide moisture proofness. Such an enclosing structure, however, is not shown in FIGS. 12 and 13. The operation of this surge absorber, constructed as described above, is similar to that of the fourth embodiment. Unlike the fourth embodiment, however, this embodiment employs a thermocontractive insulating tube 36 which has two openings 36a and 36b, so that the low-melting-point metal element 23 is cut at three positions when fused, which means that the length of the insulating section is larger, thus making it possible to cut off a continuous excess current more reliably. In addition, the dispersion in the length of the time by which the fusion takes place can be made smaller.

Figure 14:
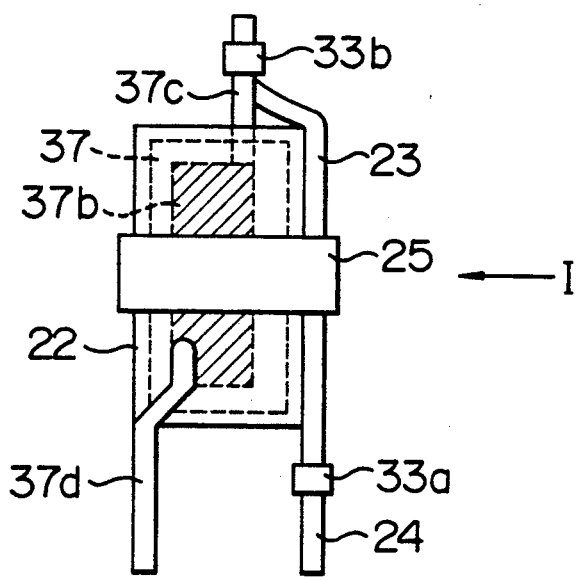
FIG. 14 is a front view showing the essential parts of a sixth embodiment of this invention.
Figure 15:
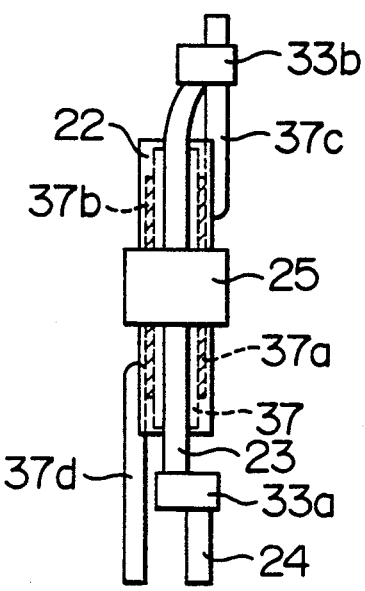
FIG. 15 is a side view of the same.

A sixth embodiment of this invention will now be described with reference to FIGS. 14 and 15. FIG. 14 is a front view of a surge absorber with a safe guard function in accordance with the sixth embodiment of this invention, and FIG. 15 is a side view of the same taken in the direction of the arrow I of FIG. 14. This embodiment is different from the first and the second embodiments in that it employs a plate varistor instead of a cylindrical varistor. In FIGS. 14 and 15, the reference numeral 37 indicates a surge absorbing element, which consists, for example, of a varistor, and which is equipped with electrodes 37a and 37b, which are formed respectively on the flat surface sections of the planar body thereof, which has at least a pair of parallel opposite sides. Connecting leads 37c and 37d are connected to these electrodes 37a and 37b, respectively. The edges of the planar body are chamfered. The reference numeral 22 indicates an insulator, which is made, for example, of an inorganic non-metal material such as glass and which partly or entirely covers over the surface of the surge absorbing element 37. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other and of this metal element is connected to the connecting lead 37c by, for example, a caulking member 33b. The reference numeral 25 indicates a thermocontractive insulating tube, which is adapted to contract, when heated, to such a degree that its inner periphery becomes smaller than the outer periphery of the surge absorbing element 37 which lies crossing at least a pair of parallel opposite sides of the surge absorbing element 37. This thermocontractive insulating tube 25 covers over the periphery of the surge absorbing element 37 and that of the low-melting-point metal element 23. Further, as in the first and the second embodiments, the components of this embodiment are in many cases enclosed by an insulating resin or the like except for the tip portions of the connecting leads 37c, 37d and 24 so as to prevent the low-melting-point metal element 23 from being scattered when it is fused and to provide moisture proofness. Such an enclosing structure, however, is not shown in FIGS. 14 and 15. The operation of this surge absorber, constructed as described above, is similar to that of the first and the second embodiments. This embodiment, however, makes it possible to make the surge absorber smaller since it enables the surge resistance value to be larger. This is due to the fact that, in the cylindrical varistor used in the first and the second embodiments, the distance between the electrodes must be larger than that in the plate varistor of this embodiment in order that the low-melting-point metal element 23 may have a predetermined length, which means that the cylindrical varistor must be made of a material of the type in which the varistor voltage per unit length is relatively small. When compared with a material with a relatively large varistor voltage per unit length, such a material provides a rather small surge resistance value.

Figure 16:
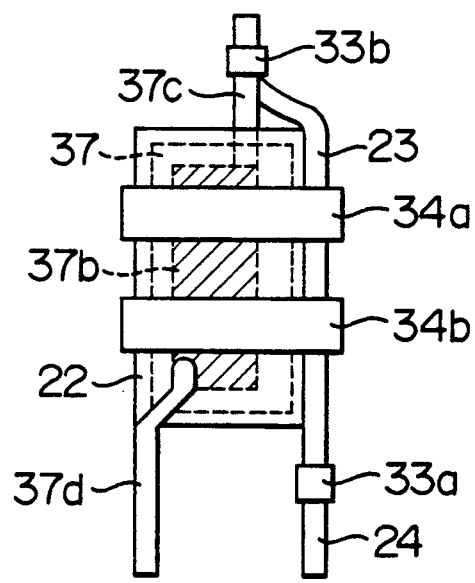
FIG. 16 is a front view showing the essential parts of a seventh embodiment of this invention.

Next, a seventh embodiment of this invention will be described with reference to FIG. 16. FIG. 16 is a front view of a surge absorber with a safe guard function in accordance with the seventh embodiment of this invention. This embodiment is different from the sixth embodiment in that it employs two thermocontractive insulating tubes 34a and 34b, which are arranged with a predetermined space therebetween. In FIG. 16, the reference numeral 37 indicates a surge absorbing element, which consists, for example, of a varistor, and which is equipped with electrodes 37a and 37b, which are formed respectively on the flat surface sections of the planar body thereof, which has at least a pair of parallel opposite sides. Connecting leads 37c and 37d are connected to these electrodes 37a and 37b, respectively. The edges of the plane body are chamfered. The reference numeral 22 indicates an insulator, which is made, for example, of an inorganic non-metal material such as glass and which partly or entirely covers the surface of the surge absorbing element 37. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 37c by, for example, a caulking member 33b. The reference numerals 34a and 34b indicate thermocontractive insulating tubes, which are adapted to contract, when heated, to such a degree that their inner peripheries become smaller than the outer periphery of the surge absorbing element 37 which lies crossing at least a pair of parallel opposite sides of the surge absorbing element 37. These thermocontractive insulating tubes 34a and 34b, arranged with a predetermined space therebetween, cover over the peripheral surface of the insulator 22, which covers over the surface of the surge absorbing element 37, and the peripheral surface of the low-melting-point metal element 23. Further, as in the first and the second embodiments, the components of this embodiment are in many cases enclosed by an insulating resin or the like except for the tip portions of the connecting leads 37c, 37d and 24 so as to prevent the low-melting-point metal element 23 from being scattered when it is fused and to provide moisture proofness. Such an enclosing structure, however, is not shown in FIG. 16. The operation of this surge absorber, constructed as described above, is similar to that of the sixth embodiment. Unlike the sixth embodiment, however, this embodiment employs two thermocontractive insulating tubes 34a and 34b, the low-melting-point metal element 23 is cut at two positions when fused, which means that the length of the insulating section is longer, thereby making it possible to cut off a continuous excess current more reliably. Furthermore, the dispersion in the length of the time by which the fusion takes place can be made smaller.

Figure 17:
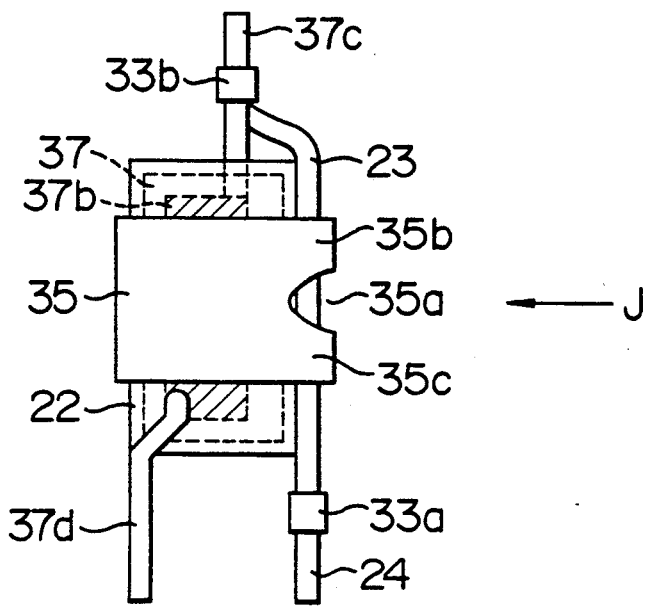
FIG. 17 is a front view showing the essential parts of an eighth embodiment of this invention.
Figure 18:
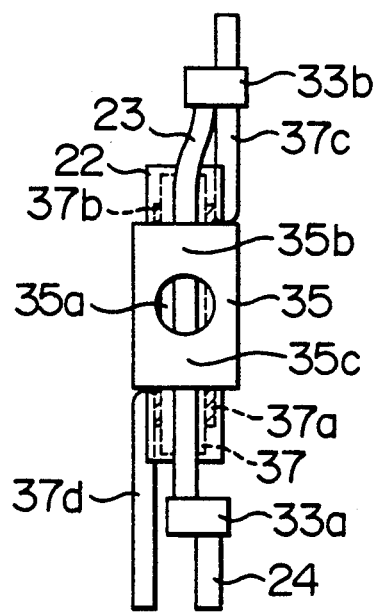
FIG. 18 is a side view of the same.

Next, an eighth embodiment of this invention will be described with reference to FIGS. 17 and 18. FIG. 17 is a front view of a surge absorber with a safe guard function in accordance with the eighth embodiment of this invention, and FIG. 18 is a side view of the same taken in the direction indicated by the arrow J of FIG. 17. This embodiment is different from the sixth and the seventh embodiments in that it employs a thermocontractive insulating tube 35 which has an opening 35a in its peripheral surface. In FIGS. 17 and 18, the reference numeral 37 indicates a surge absorbing element, which consists, for example, of a varistor that is equipped with electrodes 37a and 37b, which are formed respectively on the flat surface sections of the plane body thereof, which has at least a pair of parallel opposite sides. Connecting leads 37c and 37d are connected to these electrodes 37a and 37b, respectively. The edges of the planar body are chamfered. The reference numeral 22 indicates an insulator, which is made, for example, of an inorganic non-metal material such as glass and which partly or entirely covers over the surface of the surge absorbing element 37. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 37c by, for example, a caulking member 33b. The reference numeral 35 indicates a thermocontractive insulating tube, which is adapted to contract, when heated, to such an extent that its inner periphery becomes smaller than that outer periphery of the surge absorbing element 37 which lies crossing at least a pair of parallel opposite sides of the surge absorbing element 37. This thermocontractive insulating tube 35 has an opening 35a, so that, when it covers over that portion of the insulator 22 which covers over the surface of the section of one of those opposite sides having no electrodes, two tube portions 35b and 35c which result from the presence of the opening 35a are in contact with the low-melting-point metal element 23.

Further, as in the first and the second embodiments, the components of this embodiment are in many cases enclosed by an insulating resin or the like except for the tip portions of the connecting leads 37c, 37d and 24 so as to prevent the low-melting-point metal element 23 from being scattered when it is fused and to provide moisture proofness. Such an enclosing structure, however, is not shown in FIGS. 17 and 18. The operation of this surge absorber, constructed as described above, is similar to that of the sixth and the seventh embodiments. Unlike the sixth embodiment, however, this embodiment employs a structure in which the low-melting-point metal element 23 is in contact with the two tube portions 35b and 35c of the thermo-contractive insulating tube 35, so that the low-melting-point metal element 23 fuses at two positions, which means, that the length of the insulating section is longer, thereby making it possible to cut off a continuous excess current more reliably. Further, the dispersion in the length of the time by which the fusion takes place can be made smaller. These effects are also obtained in the seventh embodiment. In the seventh embodiment, however, the process steps of arranging the thermocontractive insulating tube 35 with a predetermined space therebetween is rather difficult, whereas, in this embodiment, the predetermined space between the two portions 35b and 35c is fixed because of the opening 35a, which leads to an improvement in the working efficiency, reduction in the cost, etc.

Figure 19:
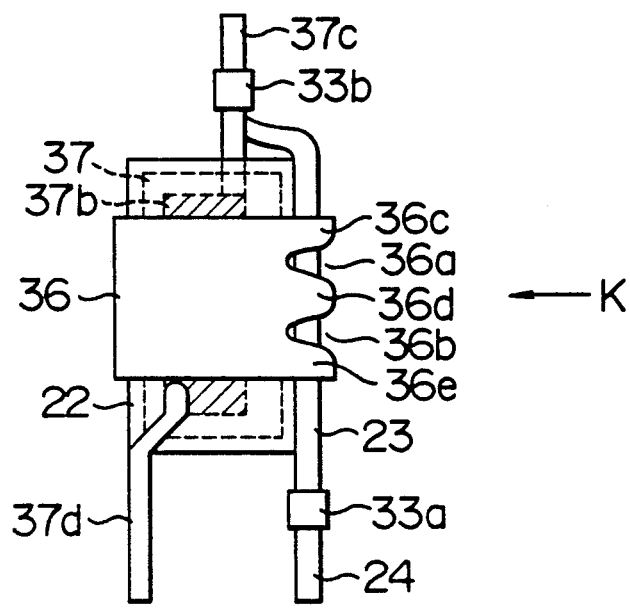
FIG. 19 is a front view showing the essential parts of a ninth embodiment of this invention.
Figure 20:
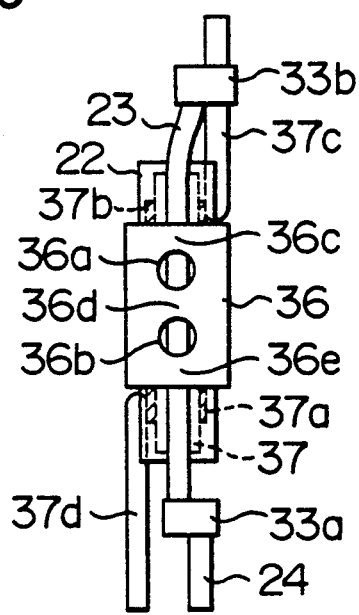
FIG. 20 is a side view of the same.

Next, a ninth embodiment of this invention will be described with reference to FIGS. 19 and 20. FIG. 19 is a front view of a surge absorber with a safe guard function in accordance with the ninth embodiment of this invention, and FIG. 20 is a side view of the same taken in the direction indicated by the arrow K of FIG. 19. This embodiment is different from the eighth embodiment in that it employs a thermocontractive insulating tube 36 which has two openings 36a and 36b. In FIGS. 19 and 20, the reference numeral 37 indicates a surge absorbing element, which consists, for example, of a varistor that is equipped with electrodes 37a and 37b, which are formed respectively on the flat surface sections of the planar body thereof, which has at least a pair of parallel opposite sides. Connecting leads 37c and 37d are connected to these electrodes 37a and 37b, respectively. The edges of the plane body are chamfered.

The reference numeral 22 indicates an insulator, which is made, for example, of an inorganic non-metal material such as glass and which partly or entirely covers over the surface of the surge absorbing element 37. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 37c by, for example, a caulking member 33b. The reference numeral 36 indicates a thermocontractive insulating tube, which is adapted to contract, when heated, to such an extent that its inner periphery becomes smaller than that outer periphery of the surge absorbing element 37 which lies crossing at least a pair of parallel opposite sides. This thermocontractive insulating tube 36 has two openings 36a and 36b so that, when it covers over that portion of the insulator 22 which covers over the surface of the section of one of those opposite sides having no electrodes, three portions 36c, 36d and 36e thereof, which result from the presence of the two openings 36a and 36b, are in contact with the low-melting-point metal element 23. Further, as in the first and the second embodiments, the components of this embodiment are in many cases enclosed by an insulating resin or the like except for the tip portions of the connecting leads 37c, 37d and 24 so as to prevent the low-melting-point metal element 23 from being scattered when it is fused and to provide moisture proofness. Such an enclosing structure, however, is not shown in FIGS. 19 and 20. The operation of this surge absorber, constructed as described above, is similar to that of the eighth embodiment. Unlike the eighth embodiment, however, this embodiment employs a thermocontractive insulating tube 36 which has two openings 36a and 36b, so that the low-melting-point metal element 23 is cut at three positions when fused, which means that the length of the insulating section is longer, thereby making it possible to cut off a continuous excess current more reliably. Further, the dispersion in the length of the time by which the fusion occurs can be made smaller.

Figure 21:
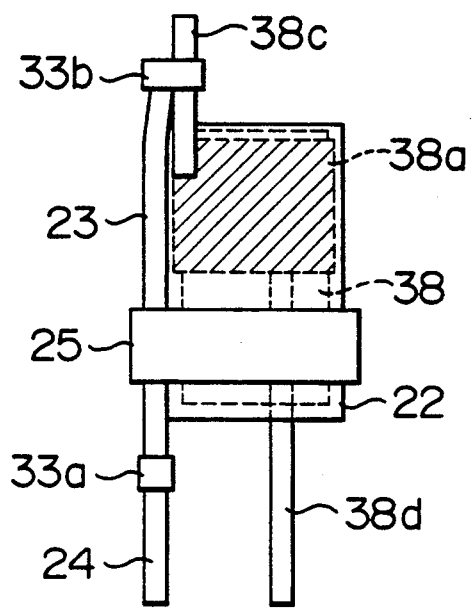
FIG. 21 is a front view showing the essential parts of a tenth embodiment of this invention.
Figure 22:
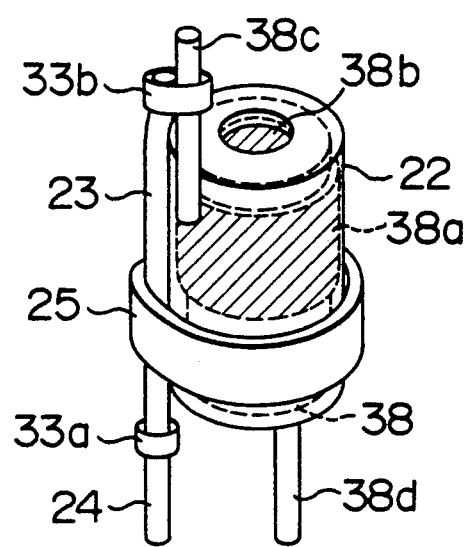
FIG. 22 is a perspective view of the same.

Next, a tenth embodiment of this invention will be described with reference to FIGS. 21 and 22. FIG. 21 is a front view of a surge absorber with a safe guard function in accordance with the tenth embodiment of this invention, and FIG. 22 is a perspective view of the same. This embodiment is different from the first, the second and the sixth embodiments in that it employs a concentric-cylinder-like varistor instead of a cylindrical or plate-like varistor as the surge absorbing element. In FIGS. 21 and 22, the reference numeral 38 indicates a surge absorbing element, which consists, for example, of a varistor that is equipped with electrodes 38a and 38b, which are formed respectively on the outer and inner side surfaces of the concentric-cylinder-like body thereof. Connecting leads 38c and 38d are connected to these electrodes 38a and 38b, respectively. The reference numeral 22 indicates an insulator, which is made, for example, of an inorganic non-metal material such as glass and which partly or entirely covers over the surface of the surge absorbing element 38. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 38c by, for example, a caulking member 33b. The reference numeral 25 indicates a thermocontractive insulating tube, which is adapted to contract, when heated, to such an extent that its diameter becomes smaller than the outer diameter of the surge absorbing element 38, and which covers over the surface of the insulator 22 that covers over the surface of the surge absorbing element 38, and the peripheral surface of the low-melting-point metal element 23. Further, as in the first and the second embodiments, the components of this embodiment are in many cases enclosed by an insulating resin or the like except for the tip portions of the connecting leads 38c, 38d and 24 so as to prevent the low-melting-point metal element 23 from being scattered when it is fused and to provide moisture proofness. Such an enclosing structure, however, is not shown in FIGS. 21 and 22. The operation of this surge absorber, constructed as described above, is similar to that of the first, the second and the sixth embodiments. This embodiment, however, can employ a material of the type in which the varistor voltage per unit length is larger than that of the material used in the first and the second embodiments, so that this embodiment makes it possible to increase the surge resistance to a relatively large value, thus enabling the surge absorber to be made smaller. This advantage can also be obtained in the sixth embodiment. Since, however, the varistor body around which the thermocontractive insulating tube 25 is wound has a curved surface, the contraction of the thermocontractive insulating tube 25 can take place more smoothly, thereby making it possible to reduce the dispersion in the length of the time by which the fusion of the low-melting-point metal element 23 takes place.

Figure 23:
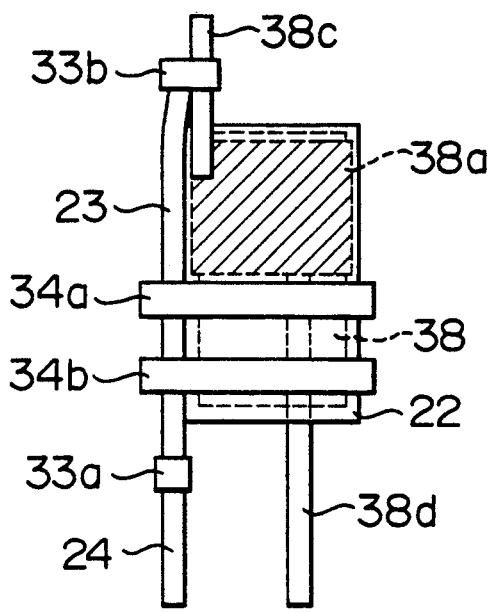
FIG. 23 is a front view showing the essential parts of an eleventh embodiment of this invention.

Next, an eleventh embodiment of this invention will be described with reference to FIG. 23. FIG. 23 is a front view of a surge absorber with a safe guard function in accordance with the eleventh embodiment of this invention. This embodiment is different from the tenth embodiment in that it employs two thermo-contractive insulating tubes 34a and 34b, which are arranged with a predetermined space therebetween. I FIG. 23, the reference numeral 38 indicates a surge absorbing element, which consists, for example, of a varistor that is equipped with electrodes 38a and 38b, which are formed respectively on the outer and inner side surfaces of the concentric-cylinder-like body thereof. Connecting leads 38c and 38d are connected to these electrodes 38a and 38b, respectively. The reference numeral 22 indicates an insulator, which is made, for example, of an inorganic non-metal material such as glass and which partly or entirely covers over the surface of the surge absorbing element 38. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 38c by, for example, a caulking member 33b. The reference numerals 34a and 34b indicate thermocontractive insulating tubes, which are adapted to contract, when heated, to such an extent that their diameters become smaller than the outer diameter of the surge absorbing element 38, and which cover over the surface of the insulator 22. These thermocontractive insulating tubes 34a and 34b, arranged with a predetermined space therebetween, cover over the surface of the insulator 22, which covers over the surface of the surge absorbing element 38, and the periphery of the low-melting-point metal element 23. Further, as in the first and the second embodiments, the components of this embodiment are in many cases enclosed by an insulating resin or the like except for the tip portions of the connecting leads 38c, 38d and 24 so as to prevent the low-melting-point metal element 23 from being scattered when it is fused and to provide moisture proofness. Such an enclosing structure, however, is not shown in FIG. 23. The operation of this surge absorber, constructed as described above, is similar to that of the tenth embodiment. Unlike the tenth embodiment, however, this embodiment employs two thermocontractive insulating tubes 34a and 34b, so that the low-melting-point metal element 23 is cut at two positions when fused, which means that the length of the insulating section is larger, thus making it possible to cut off a continuous excess current more reliably. Further, the dispersion in the length of the time by which the fusion occurs can be made smaller.

Figure 24:
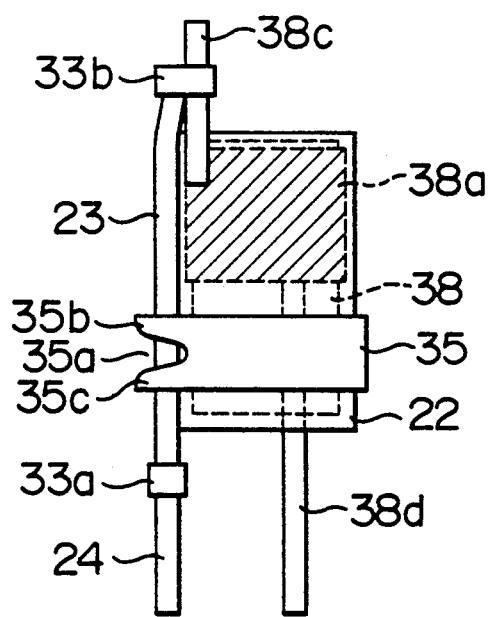
FIG. 24 is a front view showing the essential parts of a twelfth embodiment of this invention.
Figure 25:
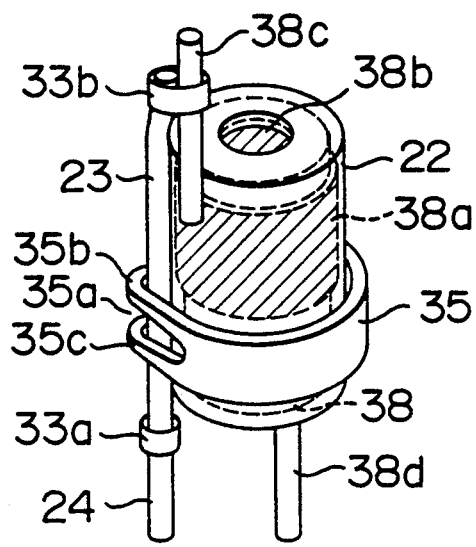
FIG. 25 is a perspective view of the same.

Next, a twelfth embodiment of this invention will be described with reference to FIGS. 24 and 25. FIG. 24 is a front view of a surge absorber with a safe guard function is accordance with the twelfth embodiment of this invention, and FIG. 25 is a perspective view of the same. This embodiment is different from the tenth and the eleventh embodiments in that it employs a thermocontractive insulating tube 35 which has an opening 35a. In FIGS. 24 and 25, the reference numeral 38 indicates a surge absorbing element, which consists, for example, of a varistor that is equipped with electrodes 38a and 38b, which are formed respectively on the outer and the inner side surfaces of the concentric-cylinder-like body thereof. Connecting leads 38c and 38d are connected to these electrodes 38a and 38b, respectively. The reference numeral 22 indicates an insulator, which is made, for example, of an inorganic non-metal material such as glass and which partly or entirely covers over the surface of the surge absorbing element 38. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 38c by, for example, a caulking member 33b. The reference numeral 35 indicates a thermocontractive insulating tube, which is adapted to contract, when heated, to such an extent that its diameter becomes smaller than the outer diameter of the surge absorbing element 38, and which covers over the surface of the insulator 22 that covers over the surface of the surge absorbing element 38, and the periphery of the low-melting-point metal element 23, two tube portions 35b and 35c of the thermocontractive insulating tube 35, which result from the presence of the opening 35a, being in contact with the low-melting-point metal element 23. Further, as in the first and second embodiments, the components of this embodiment are in many cases enclosed by an insulating resin or the like except for the tip portions of the connecting leads 38c, 38d and 24 so as to prevent the low-melting-point metal element 23 from being scattered when it is fused and to provide moisture proofness. Such an enclosing structure, however, is not shown in FIGS. 24 and 25. The operation of this surge absorber, constructed as described above, is similar to that of the tenth and the eleventh embodiments. Unlike the tenth embodiment, however, this embodiment employs a structure in which the low-melting-point metal element 23 is in contact with the two tube portions 35b and 35c of the thermocontractive insulating tube 35, so that the low-melting-point metal element 23 is cut at two positions when fused, which means that the length of the insulating section is longer, thereby making it possible to cut off a continuous excess current more reliably. Further, the dispersion in the length of the time by which the fusion to occurs can be made smaller. These advantages can also be obtained in the eleventh embodiment. In the eleventh embodiment, however, the process steps of arranging the thermocontractive insulating tubes with a predetermined space therebetween is rather difficult, whereas, in this embodiment, the space between the two portions of the thermocontractive insulating tube is fixed because of the opening 35a, which leads to an improvement in the working efficiency, reduction in the cost, etc.

Figure 26:
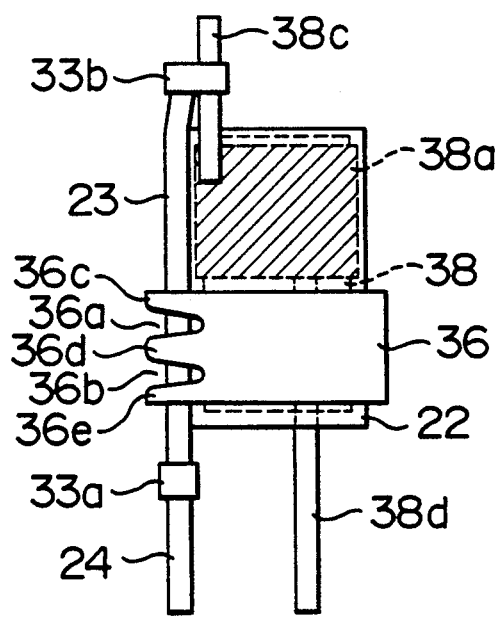
FIG. 26 is a front view showing the essential parts of a thirteenth embodiment of this invention.
Figure 27:
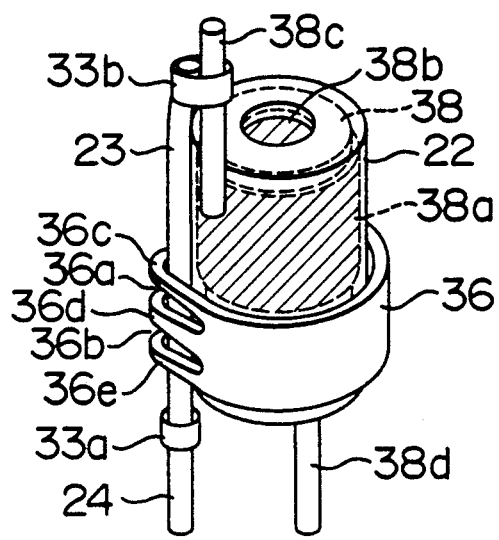
FIG. 27 is a perspective view of the same.

Next, a thirteenth embodiment of this invention will be described with reference to FIGS. 26 and 27. FIG. 26 is a front view of a surge absorber with a safe guard function in accordance with the thirteenth embodiment of this invention, and FIG. 27 is a perspective view of the same. This embodiment is different from the twelfth embodiment in that it employs a thermocontractive insulating tube 36 which has two openings 36a and 36b. In FIGS. 26 and 27, the reference numeral 38 indicates a surge absorbing element, which consists, for example, of a varistor that is equipped with electrodes 38a and 38b, which are formed respectively on the outer and inner side surfaces of the concentric-cylinder-like body thereof. Connecting leads 38c and 38d are connected to these electrodes 38a and 38b, respectively. The reference numeral 22 indicates an insulator, which is made, for example, of an inorganic non-metal material such as glass and which partly or entirely covers over the surface of the surge absorbing element 38. The reference numeral 23 indicates a low-melting-point metal element, which consists, for example, of a solder line of a tin/lead eutectic alloy. One end of this low-melting-point metal element 23 is connected to the connecting lead 24 by, for example, a caulking member 33a, and the other end of this metal element is connected to the connecting lead 38cby, for example, a caulking member 33b. The reference numeral 36 indicates a thermocontractive insulating tube, which is adapted to contract, when heated, to such an extent that its diameter becomes smaller than the outer diameter of the surge absorbing element 38. This thermocontractive insulating tube 36 has two openings 36a and 36b so that, when it covers over the insulator 22 that covers over the surface of the surge absorbing element 38, and the periphery of the low-melting-point metal element 23, the three portions 36c, 36d and 36e thereof, resulting from the presence of the two openings 36a and 36b, are in contact with the low-melting-point metal element 23. Further, as in the first and the second embodiments, the components of this embodiment are in many cases enclosed by an insulating resin or the like except for the tip portions of the connecting leads 38c, 38d and 24 so as to prevent the low-melting-point metal element 23 from being scattered when it is fused and to provide moisture proofness. Such an enclosing structure, however, is not shown in FIGS. 26 and 27. The operation of this surge absorber, constructed as described above, is similar to that of the twelfth embodiment. Unlike the twelfth embodiment, however, this embodiment employs a thermocontractive insulating tube 36 which has two openings 36a and 36b, so that the low-melting-point metal element 23 is cut at three positions when fused, which means the length of the insulating section is longer, thereby making it possible to cut off a continuous excess current more reliably. Further, the dispersion in the length of the time by which the fusion occurs can be made smaller.

Figure 28:
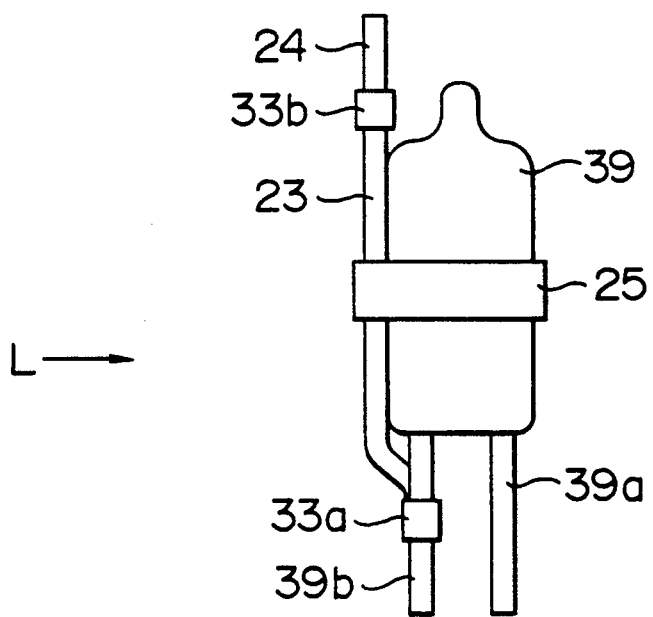
FIG. 28 is a front view showing the essential parts of a fourteenth embodiment of this invention.
Figure 29:
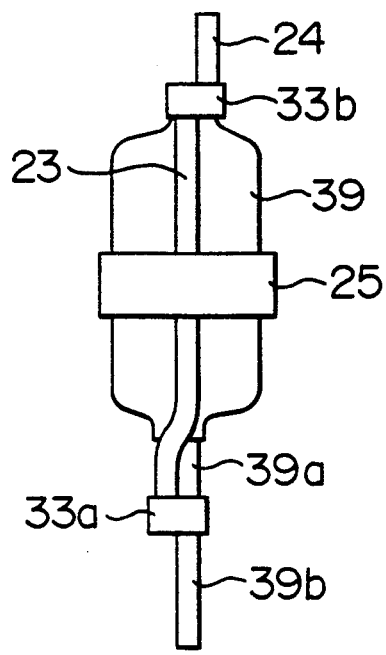
FIG. 29 is a side view of the same.

Next, a fourteenth embodiment of this invention will be described with reference to FIGS. 28 and 29. FIG. 28 is a front view of a surge absorber with a safe guard function in accordance with the fourteenth embodiment of this invention, and FIG. 29 is a side view of the same taken in the direction indicated by the arrow L of FIG. 28. This embodiment is different from the first, the second and the sixth embodiments in that it employs a discharging gap instead of a varistor as the surge absorbing element. In FIGS. 28 and 29, the reference numeral 39 indicates a surge absorbing element, which consists, for example, of a discharging gap that is equipped with connecting leads 39a and 39b. The reference numeral 23 indicates a low-melting-point metal element, which consists, for example, of a solder line of a tin/lead eutectic alloy. One end of this low-melting-point metal element 23 is connected to the connecting lead 39b by, for example, a caulking member 33a, and the other end of this metal element is connected to the connecting lead 24 by, for example, a caulking member 33b. The reference numeral 25 indicates a thermocontractive insulating tube, which is adapted to contract, when heated, to such an extent that its diameter becomes smaller than that of the surge absorbing element 39. This thermocontractive insulating tube 25 covers over the periphery of the surge absorbing element 39 and that of the low-melting-point metal element 23 in such a manner that the surface of the surge absorbing element 39 is in contact with the low-melting-point metal element 23. Further, as in the first and the second embodiments, the components of this embodiment are in many cases enclosed by an insulating resin or the like except for the tip portions of the connecting leads 39c, 39d and 24 so as to prevent the low-melting-point metal element 23 from being scattered when it is fused and to provide moisture proofness. Such an enclosing structure, however, is not shown in FIGS. 28 and 29. The operation of this surge absorber, constructed as described above, is similar to that of the first, the second, the sixth and the tenth embodiments. Unlike these embodiments, however, this embodiment employs a discharging gap instead of a varistor as the surge absorbing element, so that, although the speed of response it provides is relatively low, it can keep the residual voltage at a relatively low level.

Figure 30:
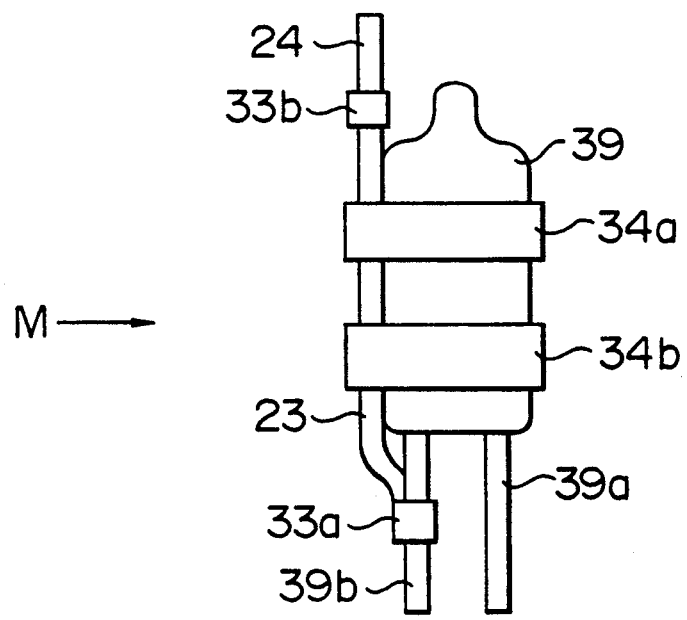
FIG. 30 is a front view showing the essential parts of a fifteenth embodiment of this invention.
Figure 31:
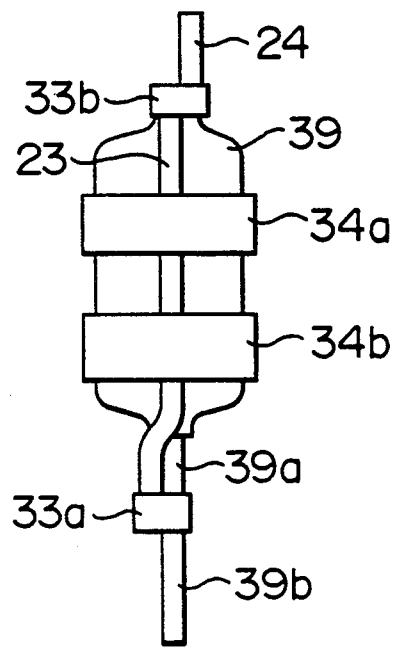
FIG. 31 is a side view of the same.

Next, a fifteenth embodiment of this invention will be described with reference to FIGS. 30 and 31. FIG. 30 is a front view of a surge absorber with a safe guard function in accordance with the fifteenth embodiment of this invention, and FIG. 31 is a side view of the same taken in the direction indicated by the arrow M of FIG. 30. This embodiment is different from the fourteenth embodiment in that it employs two thermocontractive insulating tubes 34a and 34b, which are arranged with a predetermined space therebetween. In FIGS. 30 and 31, the reference numeral 39 indicates a surge absorbing element, which consists, for example, of a discharging gap that is equipped with connecting leads 39a and 39b. The reference numeral 23 indicates a low-melting-point metal element, which consists, for example, of a solder line of a tin/lead eutectic alloy. One end of this low-melting-point metal element 23 is connected to the connecting lead 39b by, for example, a caulking member 33a, and the other end of this metal element is connected to the connecting lead 24 by, for example, a caulking member 33b. The reference numerals 34a and 34b indicate thermocontractive insulating tubes, which are adapted to contract, when heated, to such an extent that their diameters become smaller than the outer diameter of the surge absorbing element 39. These thermocontractive insulating tube, arranged with a predetermined space therebetween, cover over the periphery of the surge absorbing element 39 and that of the low-melting-point metal element 23 in such a manner that the surface of the surge absorbing element 39 is in contact with the low-melting-point metal element 23. Further, as in the first and the second embodiments, the components of this embodiment are in many cases enclosed by an insulating resin or the like except for the tip portions of the connecting leads 39c, 39d and 24 so as to prevent the low-melting-point metal element 23 from being scattered when it is fused and to provide moisture proofness. Such an enclosing structure, however, is not shown in FIGS. 30 and 31. The operation of this surge absorber, constructed as described above, is similar to that of the fourteenth embodiment. Unlike the fourteenth embodiment, however, this embodiment employs two thermocontractive insulating tubes 34a and 34b, so that the low-melting-point metal element 23 is cut at two positions when fused, which means that the length of the insulating section is larger, thus making it possible to cut off a continuous excess current more reliably. Further, the dispersion in the length of the time by which the fusion occurs can be made smaller.

Figure 32:
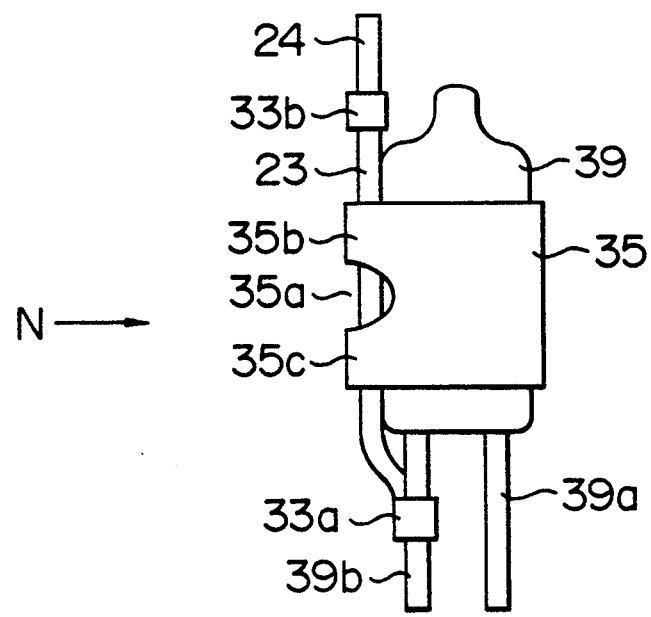
FIG. 32 is a front view showing the essential parts of a sixteenth embodiment of this invention.
Figure 33:
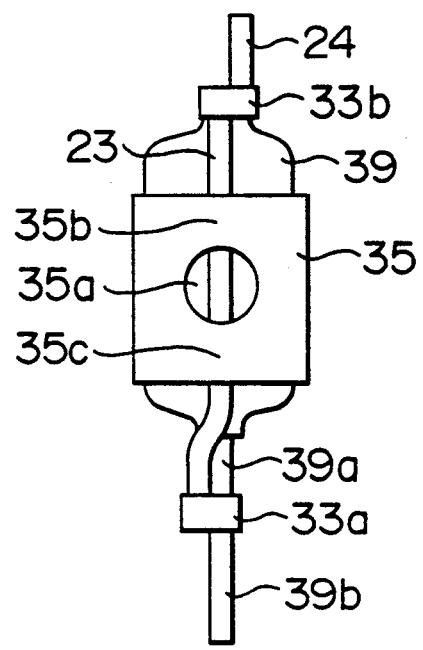
FIG. 33 is a side view of the same.

Next, a sixteenth embodiment of this invention will be described with reference to FIGS. 32 and 33. FIG. 32 is a front view of a surge absorber with a safe guard function in accordance with the sixteenth embodiment of this invention, and FIG. 33 is a side view of the same taken in the direction indicated by the arrow N of FIG. 32. This embodiment is different from the tenth and the eleventh embodiments in that it employs a thermocontractive insulating tube 35 which has an opening 35a. In FIGS. 32 and 33, the reference numeral 39 indicates a surge absorbing element, which consists, for example, of a discharging gap that is equipped with connecting leads 39a and 39b. The reference numeral 23 indicates a low-melting-point metal element, which consists, for example, of a solder line of a tin/lead eutectic alloy. One end of this low-melting-point metal element 23 is connected to the connecting lead 39b by, for example, a caulking member 33a, and the other end of this metal element is connected to the connecting lead 24 by, for example, a caulking member 33b. The reference numeral 35 indicates a thermocontractive insulating tube, which is adapted to contract, when heated, to such an extent that its diameter becomes smaller than the outer diameter of the surge absorbing element 39, and which has an opening 35a. This thermocontractive insulating tube 35 covers over the surface of the surge absorbing element 39 and the periphery of the low-melting-point metal element 23, two tube portions 35b and 36c, which result from the presence of the opening 35a, being in contact with the low-melting-point metal element 23. Further, as in the first and the second embodiments, the components of this embodiment are in many cases enclosed by an insulating resin or the like except for the tip portions of the connecting leads 39c, 39d and 24 so as to prevent the low-melting-point metal element 23 from being scattered when it is fused and to provide moisture proofness. Such an enclosing structure, however, is not shown in FIGS. 32 and 33. The operation of this surge absorber, constructed as described above, is similar to that of the fourteenth and the fifteenth embodiments. Unlike the fourteenth embodiment, however, this embodiment employs a structure in which the low-melting-point metal element 23 is in contact with the two tube portions 35b and 35c of the thermocontractive insulating tube 35, so that the low-melting-point metal element 23 is cut at two positions when fused, which means that the length of the insulating section is longer, thereby making it possible to cut off a continuous excess current more reliably. Further, the dispersion in the length of the time by which the fusion occurs can be made smaller. These advantages can also be obtained in the fifteenth embodiment. In the fifteenth embodiment, however, the process steps of arranging the thermocontractive insulating tubes with a predetermined space therebetween is rather difficult, whereas, in this embodiment, the space between the two portions of the thermocontractive insulating tube is fixed because of the opening 35a, which leads to an improvement in the working efficiency, reduction in the cost, etc.

Figure 34:
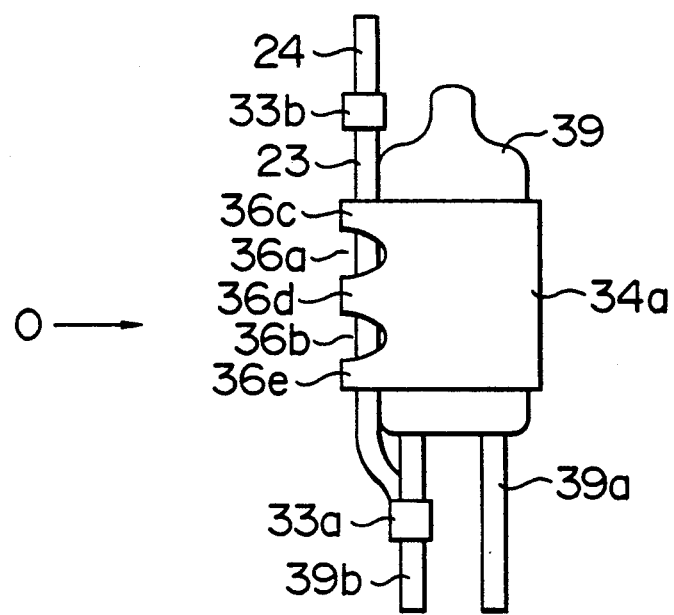
FIG. 34 is a front view showing the essential parts of a seventeenth embodiment of this invention.
Figure 35:
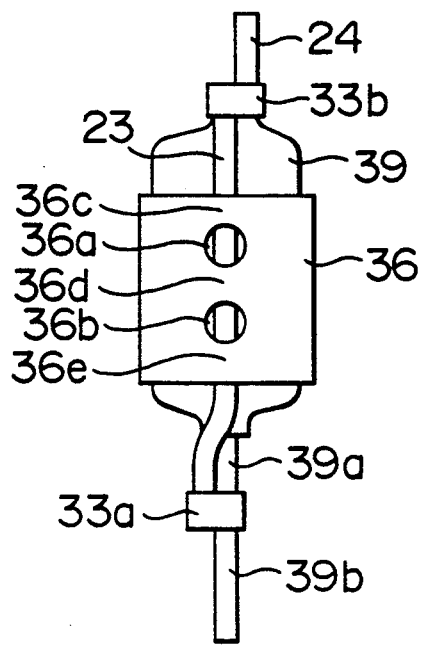
FIG. 35 is a side view of the same.
Figure 36:
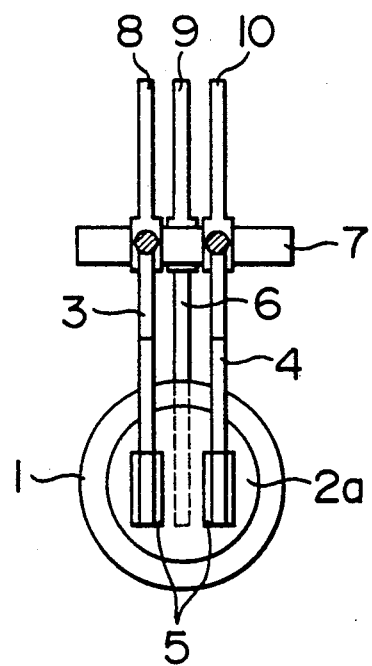
FIG. 36 is a front view showing the construction of a conventional surge absorber.
Figure 37:
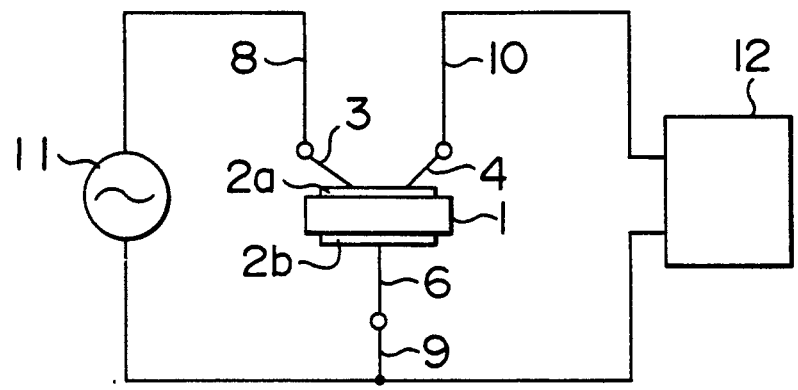
FIG. 37 is a circuit diagram showing an example of the way this surge absorber is used.
Figure 38:
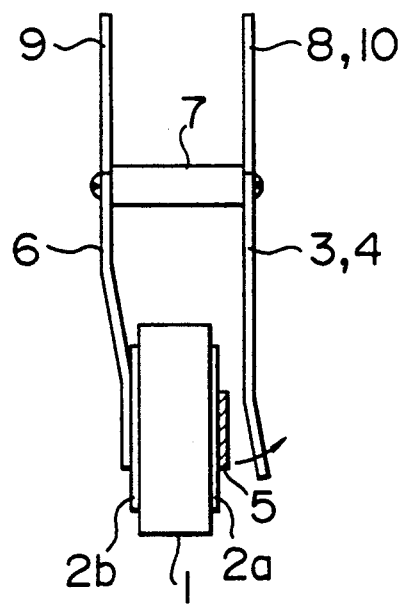
FIG. 38 is a side view illustrating the operation of this surge absorber.

Next, a seventeenth embodiment of this invention will be described with reference to FIGS. 34 and 35. FIG. 34 is a front view of a surge absorber with a safe guard function in accordance with the seventeenth embodiment of this invention, and FIG. 35 is a side view of the same taken in the direction indicated by the arrow 0 in FIG. 34. This embodiment is different from the sixteenth embodiment in that it employs a thermocontractive insulating tube 36 which has two openings 36a and 36b. In FIGS. 34 and 35, the reference numeral 39 indicates a surge absorbing element, which consists, for example, of a discharging gap that is equipped with connecting leads 39a and 39b. The reference numeral 23 indicates a low-melting-point metal element, which consists, for example, of a solder line of a tin/lead eutectic alloy. One end of this low-melting-point metal element 23 is connected to the connecting lead 39b by, for example, a caulking member 35a, and the other end of this metal element is connected to the connecting lead 24 by, for example, a caulking member 35b. The reference numeral 36 indicates a thermocontractive insulating tube, which is adapted to contract, when heated, to such an extent that its diameter becomes smaller than the outer diameter of the surge absorbing element 39. This thermocontractive insulating tube 36 has two openings 36a and 36b, so that, when it covers over the surface of the surge absorbing element 39 and the periphery of the low-melting-point metal element 23, three tube portions 36c, 36d and 36e, which result from the presence of the two openings 36a and 36b, being in contact with the low-melting-point metal element 23. Further, as in the first and the second embodiments, the components of this embodiment are in many cases enclosed by an insulating resin or the like except for the tip portions of the connecting leads 39c, 39d and 24 so as to prevent the low-melting-point metal element 23 from being scattered when it is fused and to provide moisture proofness. Such an enclosing structure, however, is not shown in FIGS. 34 and 35. The operation of this surge absorber, constructed as described above, is similar to that of the sixteenth embodiment. Unlike the sixteenth embodiment, however, this embodiment employs a thermocontractive insulating tube 36 which has two openings 36a and 36b, so that the low-melting-point metal element 23 is cut at three positions when fused, which means the length of the insulating section is longer, thereby making it possible to cut off a continuous excess current more reliably. Further, the dispersion in the length of the time by which the fusion occurs can be made smaller.

Although the above-described embodiments of this invention employ a cylindrical, plate-like, or concentric-cylinder-like varistor as the surge absorbing element, this should not be construed as restrictive. It is also possible to arrange varistors or discharging gaps, or a combination thereof, in series or in parallel. Further, while, in the above-described embodiments, glass which is an inorganic material, is employed as the insulator covering the surface of the surge absorbing element, the insulator is not limited to this. While, in the above embodiments, silicon is adopted as the material of the thermocontractive insulating tube, other types of material may also be adopted. Further, while the third, the seventh, the eleventh, and the fifteenth embodiments of this invention employ two thermocontractive insulating tubes 34a and 34b, the number of tubes is not limited to two. While the fifth, the ninth, the thirteenth, and the seventeenth embodiments of this invention adopt a thermocontractive insulating tube 36 having two openings 36a and 36b, the number of such openings is not limited to two, either. Further, while in the above-described embodiments a surge absorbing element constitutes the electronic part which is short-circuited and heated when it malfunctions, the electronic part may also consist of a resistor, a capacitor, etc.

INDUSTRIAL APPLICABILITY

As described above, this invention provides an electronic part having a safeguard function, comprising: an electronic part; a low-melting-point metal element which is electrically connected in series with this electronic part and which is held in contact with this electronic part in such a manner as to allow a satisfactory heat conduction therebetween; and a thermocontractive insulating tube covering over the periphery of the electronic part and that the low-melting-point metal element. Thus, if, in an abnormal condition, the above-mentioned electronic part is short-circuited and heated, the above-mentioned low-melting-point metal element is fused, and then the thermo-contractive insulating tube contracts, thereby causing the low-melting-point metal element to be cut. In this process, the above-mentioned thermocontractive metal element, which acts as an insulator, breaks into the low-melting-point metal element, so that the excess current can be totally cut off, thereby making it possible to prevent the above-mentioned electronic part from being ignited.

In the case where a surge absorbing element is used as the electronic part, in particular, the circuit voltage would become abnormally high due to interference with a power cable, or the operation starting voltage would be lowered as a result of a deterioration in the surge absorbing element due to repeated surge absorption. If, as a result of such conditions, a continuous excessive voltage which is in excess of the operation starting voltage of the surge absorbing element is applied to the surge absorbing element, the above-mentioned low-melting-point metal element is fused, and then, the above-mentioned thermocontractive insulating tube contracts so as to cut the low-melting-point metal element. When the thermocontractive insulating element, which acts as an insulator, thus breaks into the low-melting-point metal element, the excess current is totally cut off, and the surge absorbing element and the protected circuit are insulated from the circuit, thereby making it possible to prevent them from being ignited.

What is claimed is:

1. An electronic part having a safe guard function, comprising: an electronic part; a low-melting-point metal element which is electrically connected in series with said electronic part and which is held in contact with said electronic part in such a manner as to allow satisfactory heat conduction therebetween; and at least a thermoconductive insulation tube means with which said low-melting-point metal element is firmly held in contact with the periphery of said electronic part, whereby said low-melting-point metal element is fused by heat, which is generated by surge voltage and which is transmitted from said electronic part, and is then cut off by said thermo-contractive insulation tube means which is contracted by the heat.

2. An electronic part having a safe guard function as claimed in claim 1, wherein said thermocontractive insulating tube means comprises at least two thermocontractive insulating tubes fastened around both said low-melting-point metal element, with a predetermined space between said insulating tubes.

3. An electronic part having a safeguard function as claimed in claim 1, wherein said thermocontractive insulating tube has an opening.

4. An electronic part having a safeguard function as claimed in claim 1, wherein said electronic part, said low-melting-point metal element, and said thermocontractive insulating tube are enclosed in a casing which is made of a flame resistant insulating material.

5. An electronic part having a safeguard function as claimed in claim 1, wherein said electronic part comprises a surge absorbing element.

6. An electronic part having a safe guard function as claimed in claim 5, wherein said surge absorbing element comprises a varistor or a discharge gap.

* * * * *